(12) United States Patent
Shi et al.

(10) Patent No.: US 11,368,965 B2
(45) Date of Patent: Jun. 21, 2022

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/389,080

(22) Filed: Jul. 29, 2021

(65) Prior Publication Data
US 2021/0360644 A1 Nov. 18, 2021

Related U.S. Application Data

(63) Continuation of application No. PCT/CN2019/074706, filed on Feb. 3, 2019.

(51) Int. Cl.
| H04W 72/08 | (2009.01) |
| H04B 17/318 | (2015.01) |
| H04B 17/382 | (2015.01) |
| H04W 72/04 | (2009.01) |

(52) U.S. Cl.
CPC ........ *H04W 72/085* (2013.01); *H04B 17/318* (2015.01); *H04B 17/382* (2015.01); *H04W 72/044* (2013.01); *H04W 72/082* (2013.01)

(58) Field of Classification Search
CPC .............. H04W 72/044; H04W 72/085; H04B 17/318; H04B 17/382
See application file for complete search history.

(56) References Cited

U.S. PATENT DOCUMENTS

| 2010/0118807 A1 | 5/2010 | Seo et al. |
| 2015/0139105 A1 | 5/2015 | Guo et al. |
| (Continued) | | |

FOREIGN PATENT DOCUMENTS

| CN | 102238732 A | 11/2011 |
| CN | 102783165 A | 11/2012 |
| (Continued) | | |

OTHER PUBLICATIONS

International Search Report issued in corresponding International Application No. PCT/CN2019/074706, dated Jul. 30, 2019, 37 pages.

(Continued)

*Primary Examiner* — Charles C Jiang
*Assistant Examiner* — Ryan C Kavleski
(74) *Attorney, Agent, or Firm* — Bayes PLLC

(57) ABSTRACT

Disclosed in the embodiments of the present disclosure are a wireless communication method, a terminal device and a network device. The method includes a terminal device that determines a first frequency domain resource within a pre-configured resource block (RB) range; and performs interference measurement or received energy measurement over the first frequency domain resource.

20 Claims, 11 Drawing Sheets

(56) References Cited

U.S. PATENT DOCUMENTS

| | | | |
|---|---|---|---|
| 2015/0271830 A1* | 9/2015 | Shin | H04L 1/206 370/329 |
| 2018/0063736 A1 | 3/2018 | Sadeghi et al. | |
| 2020/0177291 A1* | 6/2020 | Fei | H04W 24/10 |
| 2020/0221429 A1* | 7/2020 | Li | H04L 5/0053 |
| 2020/0351688 A1* | 11/2020 | Siomina | H04B 17/318 |

FOREIGN PATENT DOCUMENTS

| | | |
|---|---|---|
| CN | 103580835 A | 2/2014 |
| CN | 104685918 A | 6/2015 |
| CN | 104956716 A | 9/2015 |
| CN | 106993260 A | 7/2017 |
| CN | 108809454 A | 11/2018 |
| CN | 108811102 A | 11/2018 |
| CN | 109219970 A | 1/2019 |
| EP | 3609216 A1 | 2/2020 |
| WO | 2014/088662 A1 | 6/2014 |

OTHER PUBLICATIONS

PCT Written Opinion of the International Searching Authority issued in corresponding International Application No. PCT/CN2019/074706, dated Jul. 30, 2019, 9 pages.

Extended European Search Report issued in corresponding European Application No. 19913521.1, dated Nov. 18, 2021, 11 pages.

First Office action issued in corresponding India Application No. 20211703974, dated Mar. 10, 2022, 6 pages.

First Office action issued in corresponding Chinese Application No. 202110850413 9, dated Mar. 25, 2022, 19 pages.

First Office action issued in corresponding India Application No. 202117039742, dated Mar. 10, 2022, 6 pages [Resubmitted to correct a typographical error in the Application number previously filed May 9, 2022—For Record Only].

* cited by examiner

200 — determining, by a terminal device, a first frequency domain resource within a pre-configured resource block (RB) range — S210
performing, by the terminal device, interference measurement or received energy measurement over the first frequency domain resource — S220
FIG. 3
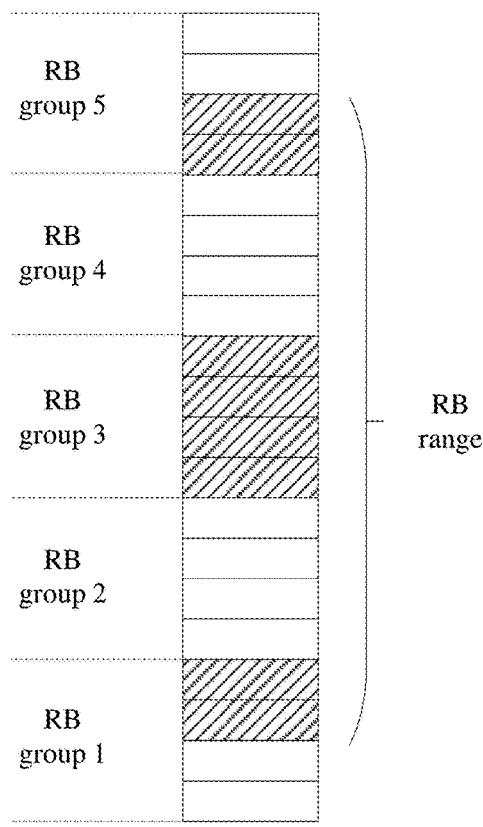
FIG. 4a
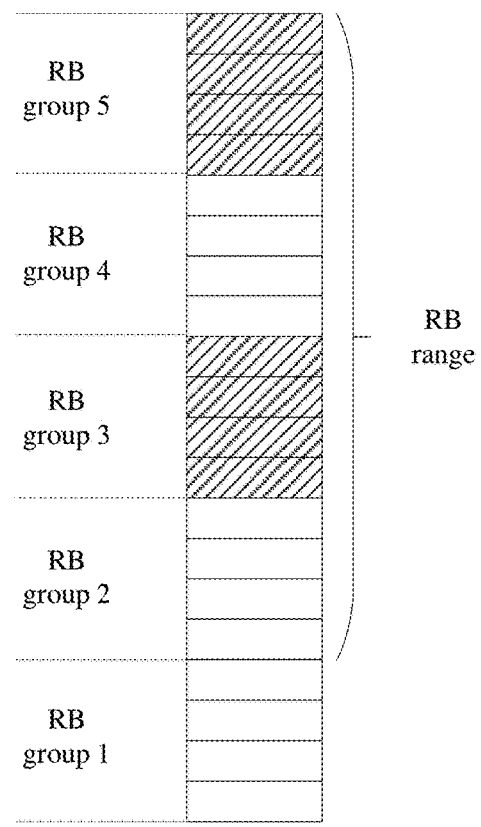
FIG. 4b Pattern 1  Pattern 2  Pattern 3  {1 1 1}

Pattern 1　　Pattern 2　　Pattern 3　　Pattern 4　　[1 0 1 0]

WIRELESS COMMUNICATION METHOD, TERMINAL DEVICE AND NETWORK DEVICE

CROSS-REFERENCE TO RELATED APPLICATION

This application is a continuation application of International Application No. PCT/CN2019/074706, filed on Feb. 3, 2019, the entire contents of which are incorporated herein by reference.

BACKGROUND

Embodiments of the present disclosure relates to the field of communications, and more particularly, to a wireless communication method, a terminal device, and a network device.

In a wireless communication system, interference may affect a terminal device. For example, if adjacent user equipment (UE) belonging to different base stations adopt a same uplink and downlink configuration, then one of the UEs may be interfered by signals sent by other base stations. For another example, if the adjacent UEs adopt different uplink and downlink configurations, uplink and downlink transmissions of the adjacent UEs may not be synchronized, which may cause the UE that is performing a downlink reception to be interfered by the UE that is performing an uplink transmission.

At present, the terminal device may measure energy of a receiving signal on a time-frequency resource.

SUMMARY

Embodiments of the present disclosure provide a wireless communication method, a terminal device, and a network device.

In a first aspect, there is provided a wireless communication method. The method includes determining, by a terminal device, a first frequency domain resource within a resource block (RB) range which is capable of being used for interference measurement or received energy measurement; and performing, by the terminal device, the interference measurement or the received energy measurement over the first frequency domain resource.

In a second aspect, there is provided a wireless communication method. The method includes sending, by a network device, configuration information to a terminal device, and the configuration information is used for indicating a first frequency domain resource within a resource block (RB) range which is capable of being used for interference measurement or received energy measurement.

In a third aspect, there is provided a terminal device, configured to perform the method in the first aspect or any of the implementations thereof.

Specifically, the terminal device includes functional modules configured to perform the method in any one of the first to second aspects or any of the implementations thereof.

In a fourth aspect, there is provided a network device, including a processor and a memory. The memory is configured to store a computer program, and the processor is configured to call and run the computer program stored in the memory to perform the method in any one of the first to second aspects or any of the implementations thereof.

In a fifth aspect, there is provided a chip, configured to perform the method in any one of the first to second aspects or any of the implementations thereof.

Specifically, the chip includes a processor, configured to call and run a computer program from a memory, so that a device installed with the chip performs the method in any one of the first to second aspects or any of the implementations thereof.

In an sixth aspect, there is provided a computer-readable storage medium, configured to store a computer program that causes a computer to perform the method in any one of the first to second aspects or any of the implementations thereof.

In a seventh aspect, there is provided a computer program product, including computer program instructions, which cause the computer to perform the method in any one of the first to second aspects or any of the implementations thereof.

In an eighth aspect, there is provided a computer program which, when run on a computer, causes the computer to perform the method in any one of the first to second aspects or any of the implementations thereof.

BRIEF DESCRIPTION OF THE DRAWINGS

FIG. 3 is a schematic block diagram of a wireless communication method provided by an embodiment of the present disclosure.

FIG. 4a is a schematic diagram of a RB range in an embodiment of the present disclosure.

FIG. 4b is another schematic diagram of a RB range in an embodiment of the present disclosure.

DETAILED DESCRIPTION

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

It should understood that the technical solutions according to the embodiments of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a New Radio ("NR" for short) or future 5G system, or the like.

In particular, the technical solutions of the embodiments of the present disclosure may be applied to various communication systems based on non-orthogonal multiple access technology, such as a Sparse Code Multiple Access (SCMA) system, a Low Density Signature (LDS) system, etc., and the SCMA system and the LDS system may also be referred to as other names in the communication field; further, the technical solutions of the embodiments of the present disclosure may be applied to a multi-carrier transmission system using the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system, a Filtered-OFDM (F-OFDM) system, and the like using the non-orthogonal multiple access technology.

Figure 1:
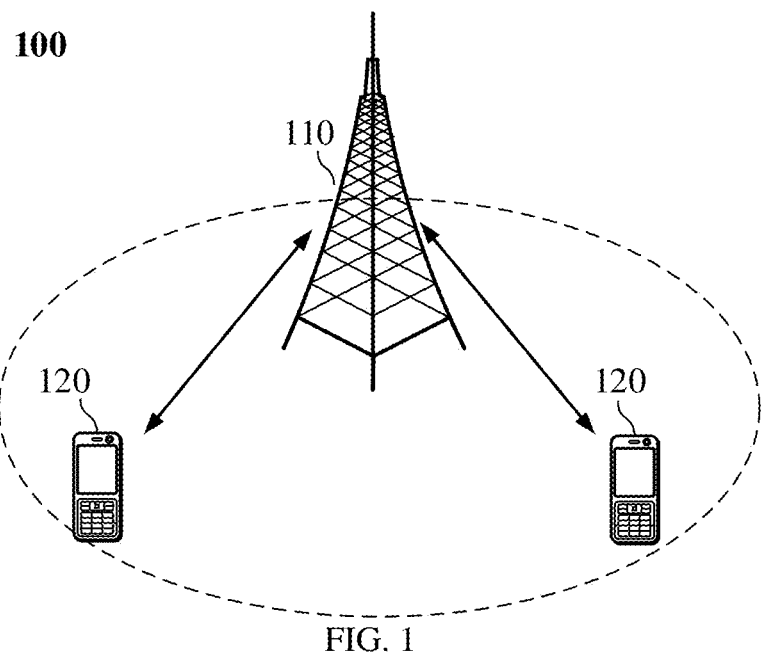
FIG. 1 is a schematic diagram of a communication system architecture provided by an embodiment of the present disclosure.

Exemplarily, a communication system 100 applied in an embodiment of the present disclosure is shown in FIG. 1. The communication system 100 may include a network device 110. The network device 110 may be a device communicating with user equipment (UE) 120 (or referred to as a communication terminal or a terminal). The network device 110 may provide communication coverage to a specific geographic region, and may communicate with UE located within the coverage region. Optionally, the network device 110 may be a base transceiver station (BTS) in a global system for mobile communications (GSM) or a code division multiple access (CDMA) system, or a nodeB (NB) in a wideband code division multiple access (WCDMA) system, or an evolutional node B (eNB or eNodeB) in a long term evolution (LTE) system, or a radio controller in a cloud radio access network (CRAN). Or, the network device may be a mobile switching center, a relay station, an access point, a vehicle device, a wearable device, a concentrator, a switchboard, a network bridge, a router, a network device (gNB) in a 5th generation (5G) network, or a network device in a public land mobile network (PLMN) that will be evolved in the future, and the like.

The communication system 100 further includes at least one UE 120 located within a coverage range of the network device 110. The "UE" used herein includes, but not limited to, a UE, an access terminal, a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, a UE in a future 5G network, or UE in a public land mobile network (PLMN) that will be evolved in the future, and the like, which is not limited by the embodiments of the present disclosure.

Optionally, device to device (D2D) communication may be realized among the UE 120.

Optionally, a 5G system or 5G network may also be referred to as a new radio (NR) system or NR network.

FIG. 1 exemplarily illustrates one network device and two of UEs. Optionally, the communication system 100 may include a plurality of network devices, and a coverage range of each network device may include other numbers of UEs, which is not limited by the embodiment of the present disclosure.

Optionally, the communication system 100 may also include other network entities such as a network controller and a mobile management entity, which is not limited by the embodiment of the present disclosure.

It should be understood that a device having a communication function in a network/system in the embodiment of the present disclosure may be referred to as a communication device. The communication system 100 shown in FIG. 1 is taken as an example. The communication device may include a network device 110 and UE 120 which have communication functions. The network device 110 and the UE 120 may be the above-mentioned specific devices, and descriptions thereof are omitted here. The communication device may also include other devices in the communication system 100, such as other network entities including the network controller, the mobile management entity, and the like, which is not limited by the embodiment of the present disclosure.

It should be understood that the terms "system" and "network" herein may often be interchanged herein. The term "and/or" herein is only an association relationship that describes associated objects, and represents that there may be three relationships. For example, A and/or B may represent that: A exists alone, A and B exist simultaneously, and B exists alone. In addition, the character "/" herein generally indicates that front and back associated objects are in an "or" relationship.

Figure 2:
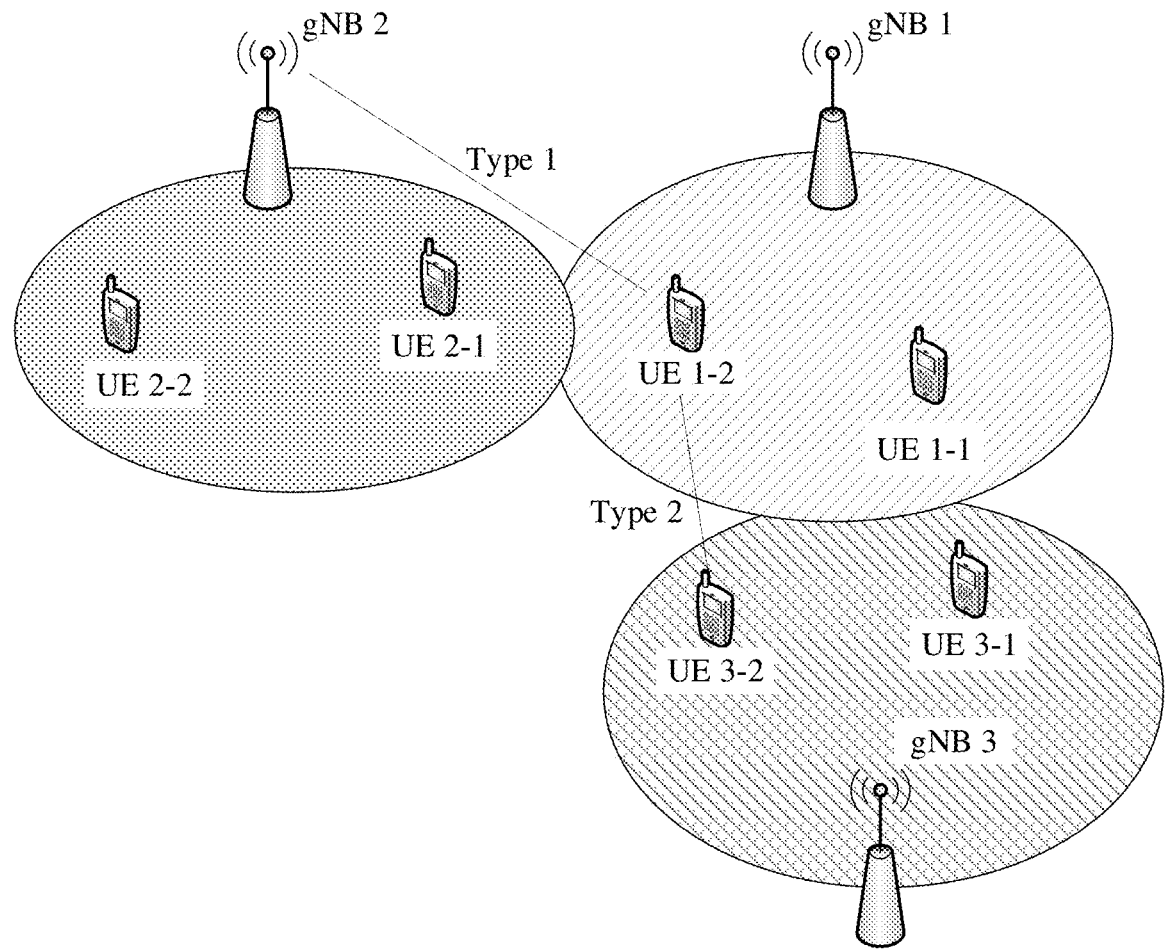
FIG. 2 is a schematic diagram of a scenario to which an embodiment of the present disclosure is applicable.

In a wireless communication system, interference has always been a critical issue that plagues the terminal device. The interference to the terminal device may include Type 1 and Type 2. Taking FIG. 2 as an example, in the figure, UE1-1 and UE1-2 belong to a cell covered by gNB1, UE2-1 and UE2-2 belong to a cell covered by gNB2, and UE3-1 and UE3-2 belong to a cell covered by gNB3. If neighboring cells all use the same uplink and downlink configuration, when UE1-2 receives a downlink signal, other cells are also performing downlink signal transmission (if there is transmission), and there will be no uplink signal transmission. Therefore, UE1-2 It will only be interfered by signals sent by other gNBs, that is, Type1 interference; if relatively dynamic uplink and downlink configuration is supported, for example, a current service of UE3-2 has uploading data with large traffic, then gNB3 may configure more uplink resources for the transmission of UE3-2, when the uplink and downlink transmission directions of UE1-2 and UE3-2 are different, Type 2 interference may occur. That is, when UE1-2 is receiving the downlink data transmission, it is interfered by UE3-2 sending the uplink signal, and interference measurement for the Type 2 may be called cross-link interference (CLI) measurement.

The example given above is based on between the terminal and the terminal. CLI measurement is not only limited to between the terminal and the terminal, but can also be used in other similar situations, such as between the network device and network device.

It should be understood that the embodiments of the present disclosure may be applied to the above CLI measurement, and may also be applied to measurement for the above Type 1, and may also be applied to other interference measurements. Although the CLI measurement is mainly taken as an example in the embodiments of the present disclosure, those skilled in the art understand, this should not constitute a limit.

FIG. 3 shows a schematic block diagram of a wireless communication method 200 according to an embodiment of the present disclosure. As shown in FIG. 3, the method 200 may include some or all of the following content:

In S210, a terminal device determines a first frequency domain resource within a pre-configured resource block (RB) range.

In S220, the terminal device performs interference measurement or received energy measurement over the first frequency domain resource.

The first frequency domain resource or the resource block (RB) range is in term of a corresponding orthogonal frequency division multiplexing (OFDM) symbol. That is, the first frequency domain resource or the resource block (RB) range refers to a frequency domain resource on one or more OFDM symbols, rather than frequency domain resources on all times.

Specifically, the network device may configure the resource block (RB) range for the terminal device or pre-agree the resource block (RB) range for the terminal device by an agreement. For example, the network device may configure the terminal device with at least two of start RB information, end RB information, and information about the number of the RBs of the RB range. Alternatively, the resource block range may be a range of a bandwidth part (BWP). The terminal device may determine a frequency domain resource within the RB range to perform the interference measurement or the received energy measurement, for example, perform received signal strength indication (RSSI) measurement to obtain a RSSI value, where the RSSI value refers to a linear average value of a total received power obtained by the UE through measurement on certain OFDM symbols on a measurement time resource and resource elements configured in a measurement bandwidth.

For the terminal device, the pre-configured RB range may not completely be used for the interference measurement or the received energy measurement. The interference measurement or the received energy measurement is only performed over some of the frequency domain resources. If the other part of the frequency domain resources is used for normal signal transmission, the waste of frequency domain resources may be reduced, thereby improving the performance of terminal device.

The network device may also configure time domain information corresponding to the RB range. The time domain information may include, for example, at least two of start symbol indication information, end symbol indication information, and the number of symbols.

It should be noted that RB is a resource unit allocated for service channel resources, it may be one time slot in a time domain, twelve subcarriers in a frequency domain, and one resource element (RE) may be one subcarrier in in the frequency domain, that is, one RB may include twelve REs in the frequency domain. Generally, the RB may include two types, a virtual resource block (VRB) and a physical resource block (PRB). The VRB is a virtual RB. Resources are allocated according to the VRB, and then the VRB is mapped to the PRB.

The embodiments of the present disclosure may be applied to the above-mentioned CLI measurement. First, introduction of CLI and the necessity of CLI measurement will be briefly introduced.

On the terminal device, different services or application software have different requirements for an uplink data rate and a downlink data rate. For example, when watching a movie on a mobile phone, the downlink data rate is typically higher than the uplink data rate. In contrast, some services or application software (such as backing up local data to the cloud) often require the uplink data rate higher than the downlink data rate. For the same service or application software, different operations often have different requirements on the uplink and downlink data rates. For example, uploading videos for sharing requires a higher uplink data rate, while watching videos shared by friends requires a higher downlink data rate.

Based on situations of the above-mentioned actual service or application software, if the wireless network maintains fixed or semi-static uplink and downlink resource allocation (for example, fixed uplink and downlink slot configuration in the LTE/NR system), It may be impossible to optimally match the service transmission in a short period of time, resulting in inefficient use of resources, and the UE experience cannot be further improved.

In order to solve the above problems, a method of dynamically adjusting the uplink and downlink transmission directions (transmission resources) may be adopted. For example, the downlink data volume of the current cell or UE increases, the network may make more resources for downlink transmission (for example, make more slots for downlink transmission).

The NR system has indicated a flexible slot format. In one of the slots, some symbols are configured for downlink (D), some symbols are configured for being flexible (F), and some symbols are configured for uplink (U). Some configurations currently supported in the NR protocol are shown in table 1. Table 1 includes some slot formats. For example, in Format 20, first two symbols of a slot are configured as D, the last symbol is configured as U, and eleven symbols in the middle are configured as F.

TABLE 1

Slot formats for cyclic prefix

| Slot format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

If the cell changes the slot format relatively dynamically, or the base station changes the corresponding slot format for a certain UE or some UEs, CLI may occur. Alternatively, if the slot format does not change, CLI may also occur. For example, all symbols in one slot are configured as F, that is, format 2 in table 1. The gNB1 in FIG. 2 uses this slot for the downlink transmission of UE1-2, and gNB3 uses this slot for the uplink transmission of UE3-2, and CLI may also occur.

Therefore, it is necessary to perform the CLI measurement to control the interference caused by different uplink and downlink transmission directions and ensure the performance of the UE.

In the embodiments of the present disclosure, an overall process is as follows.

In step 1, the network device may send related configurations to the terminal device, for example, configuration of the measurement resource or configuration of a report value.

In step 2, the terminal device may perform a related measurement according to the measurement configuration, and report a measurement result to the network device according to the configuration of the report value.

In step 3, the network device may determine whether it is necessary to modify the uplink and downlink transmissions according to the received report information, so as to avoid interference to the terminal device.

Some of the above steps are optional, for example, the step 3. The network may not perform any processing when receiving the report information.

Optionally, the terminal device may receive first information of the network device, and the first information may be used for indicating at least one RB within the range of the RB, and then the terminal device may determine the first frequency domain resource according to the at least one RB indicated by the first information. Alternatively, the terminal device may not receive the first information, that is to say, the network device does not indicate the at least one RB within the RB range, then the terminal device may determine the first frequency domain resource according to the at least one RB (that is, at least one RB defaulted by the terminal device) within the RB range agreed by the protocol in advance.

Figure 5:
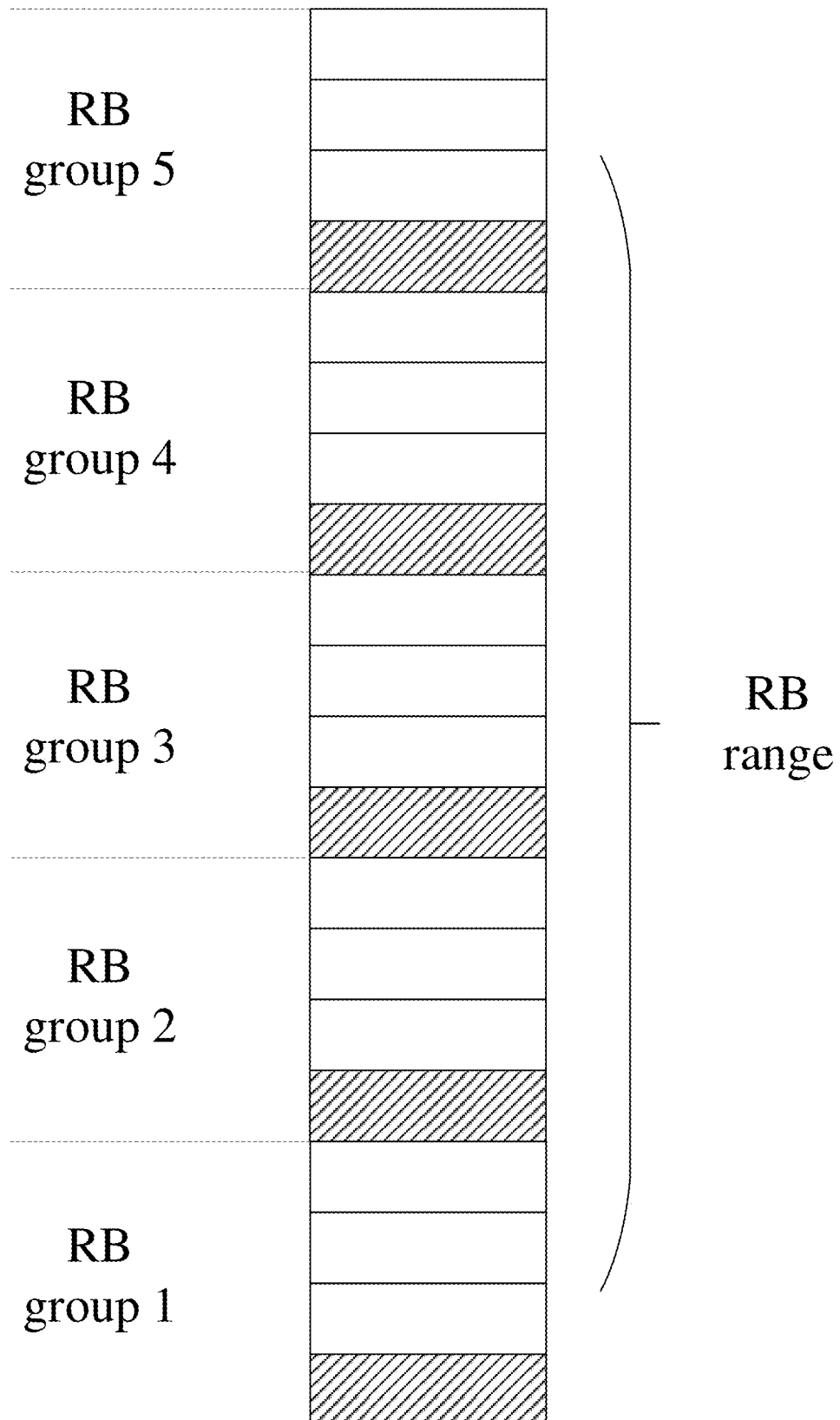
FIG. 5 is a schematic diagram of a RB grouping in an embodiment of the present disclosure.

Optionally, A RBs may be used as a group to group a certain frequency domain range. For example, the certain frequency domain range may be a part of the bandwidth of the system, or the entire bandwidth of the system, or a range of the bandwidth part (BWP), or other bandwidths that include the RB range, then the RB range may include one RB group or multiple RB groups. For example, the RB range may include one or more incomplete RB groups, as shown in FIG. 4a. The RB range may also include one or more complete RB groups, as shown in FIG. 4b. The first information may indicate at least one RB group, and the terminal device may determine the first frequency domain resource in combination with the RB range. If a certain RB group indicated by the first information is incomplete in the RB range, the first frequency domain resource may include the frequency domain resources in the RB group included in the RB range. Optionally, based on the foregoing grouping, the first information indicates a specific RB in a RB group, and the terminal device may determine the first frequency domain resource according to a frequency domain resource consists of the specific RB indicated by the first information in each RB group within the RB range. For example, as shown in FIG. 5, the entire frequency domain range includes 20 RBs. With 4 RBs as a group, it may be divided into 5 RB groups in total. The RB range may be 16 RBs in the middle of the entire frequency domain range. If the first information indicates a first one of the RBs in a RB group, then the frequency domain resource consists of the specific RB indicated by the first information in each RB group within the RB range includes the 3rd, 7th, 11th, and 15th RBs in the RB range. Optionally, based on the above grouping, the network device does not indicate a specific RB in a RB group to the terminal device, then the terminal device may determine the first frequency domain resource according to the specific RB (that is, a default RB by the terminal device) within the RB range that is pre-appointed by the protocol in each RB group. For example, the default RB in one RB group may be a first one of the RBs in the RB group. Similarly, the first frequency domain resource may be determined by the 3rd, 7th, 11th, and 15th RBs in the RB range shown in FIG. 5. Alternatively, the default RBs in one RB group may also include all RBs in one RB group.

Optionally, grouping may be performed only within the RB range, and each RB group may include the same or different number of RBs. For example, the number of RBs included in the first RB group and the last RB group may be smaller than the number of RBs included in the middle RB groups. The number of RBs included in the middle RB groups may be same. The grouping may be agreed in advance by the protocol or pre-configured by the network device. Similarly, the network device may send the first information to the terminal device, and the first information indicates at least one of the RB groups. Alternatively, grouping may be performed only within the RB range, and each RB group only includes the same number of RBs. The network device may send the first information to the terminal device, and the first information indicates a specific RB in a RB group.

Optionally, the foregoing grouping may also start from a common resource block 0, or the network device may also indicate the start RB of the grouping to the terminal device.

Optionally, the number of RBs included in one RB group, for example, the above-mentioned A may be agreed by the protocol and is a fixed value; or may also be agreed by the protocol and is related to the bandwidth range. For example, the number of RBs included in different bandwidths, and the number of RBs included in one RB group may also be different; or the number of RBs included in one RB group may be directly configured by the network device; or it may also be related to the RB range configured by the network device. For example, if the RB range indicated by the network includes X RBs, then one RB group may include X RBs. Or the number of RBs included in one RB group may also be a size of a resource block group (RBG). The size of the RBG may be as shown in Table 2.

TABLE 2

| BWP size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Figure 6:
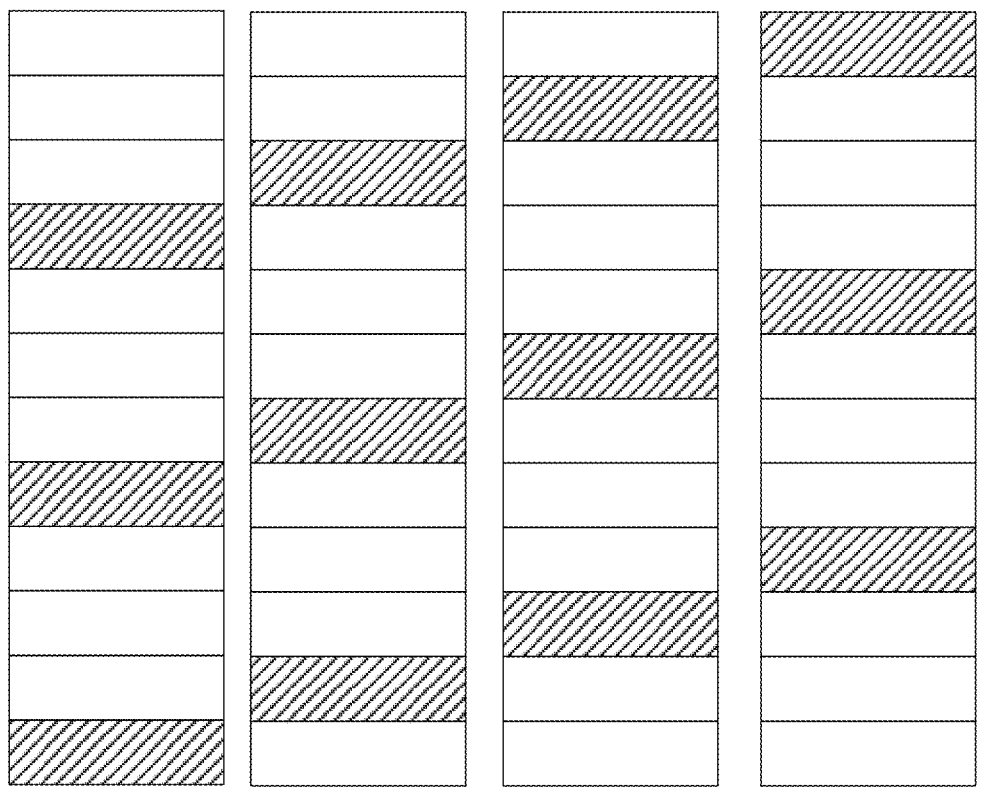
FIG. 6 is a schematic diagram of multiple patterns corresponding to a RB range in an embodiment of the present disclosure.
Figure 7:
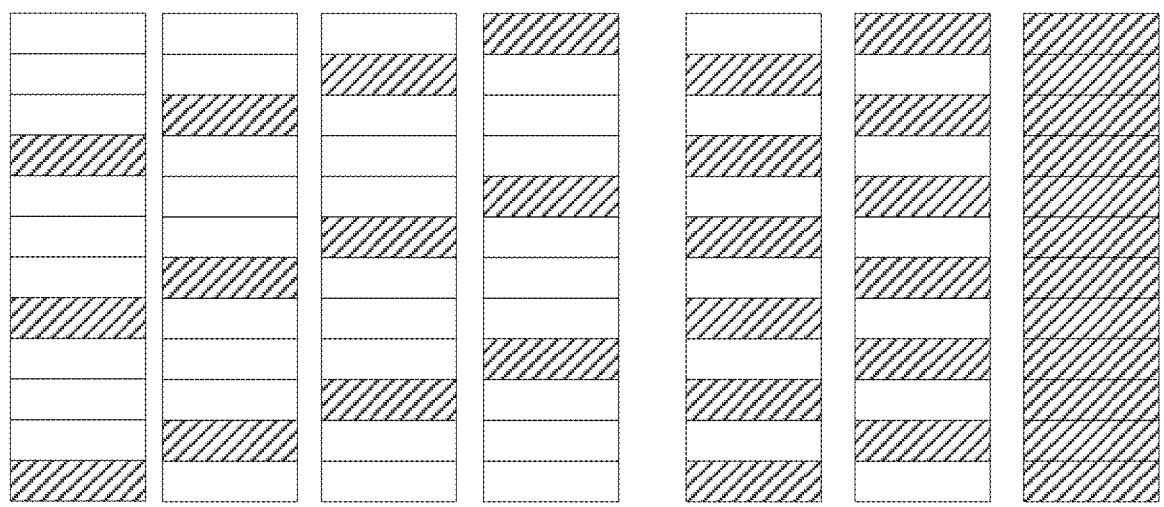
FIG. 7 is another schematic diagram of multiple patterns corresponding to a RB range in an embodiment of the present disclosure.

Optionally, the RB range may also be represented by a pattern. For example, the RB range may correspond to B patterns, and a combination of the B patterns may constitute the entire RB range. The network device may configure the B patterns for the terminal device in advance, or the B patterns may also be pre-agreed by the protocol and stored in the terminal device. The network device may send the first information to the terminal device, and the first information may indicate at least one of the patterns, and the terminal device may determine the first frequency domain resource according to the at least one pattern indicated by the first information within the RB range. For example, as shown in FIG. 6, the RB range includes 12 RBs, and the RB range corresponds to 4 patterns, and a shaded part in each pattern indicates that it may be used for the interference measurement or the received energy measurement. A combination of the shaded part of each of the four patterns may represent the entire RB range. The $1^{st}$, $5^{th}$ and $9^{th}$ RBs in pattern 1, the $2^{nd}$, $6^{th}$ and $10^{th}$ RBs in pattern 2, the $3^{rd}$, $7^{th}$ and $11^{th}$ RBs in pattern 3, and the $4^{th}$, $8^{th}$ and $12^{th}$ RBs in pattern 4 may be used for performing the interference measurement or the received energy measurement. If the first information indicates the pattern 1 and the pattern 3, the terminal device may determine the first frequency domain resource through the $1^{st}$, $3^{rd}$, $5^{th}$, $9^{th}$ and $11^{th}$ RBs within the RB range. It should be understood that the B patterns corresponding to the RB range may come from one or more pattern sets. As shown in FIG. 7, the RB range corresponds to 7 patterns, where patterns 1 to 4 are from one pattern set, patterns 5 and 6 are from one pattern set, and pattern 7 is a pattern set. Then the at least one pattern indicated by the first information may come from one pattern set or multiple pattern sets. For example, if the first information indicates patterns 1 to 3, then at least one pattern indicated by the first information belongs to the same pattern set. For another example, if the first information indicates pattern 2, pattern 5, and pattern 7, then the at least one pattern indicated by the first information belongs to different pattern sets.

It should be understood that the terminal device may use at least one RB within the RB range indicated by the first information or all frequency domain resources on at least one default RB within the RB range to perform the interference measurement or the received energy measurement. That is, the terminal device may determine the at least one RB within the RB range indicated by the first information or all frequency domain resources on the at least one default RB within the RB range as the first frequency domain resource. Alternatively, the terminal device may also determine the at least one RB within the RB range indicated by the first information or a part of the frequency domain resources in the at least one default RB in the RB range as the first frequency domain resource. For example, the terminal device may also combine the second information sent by the network device, where the second information is used for indicating a specific RE on an RB. In this case, the terminal device may determine the frequency domain resource consists of the specific RE on each RB in the at least one RB determined in the foregoing manner within the RB range as the first frequency domain resource. For example, the terminal device may combine the first information and the second information to determine the first frequency domain resource. That is, the terminal device may determine the frequency domain resource consists of the at least one RE indicated by the second information on each of the at least one RB indicated by the first information within the RB range as the first frequency domain resource.

For another example, the network device does not send the second information to the terminal device, and the terminal device may combine RBs on one RB agreed by the protocol (default). In this case, the terminal device may determine the frequency domain resource consists of the default REs on each of the at least one RB determined in the foregoing manner within the RB range as the first frequency domain resource. The default RE may be, for example, the first RE of each RB, or all REs on each RB (that is, 12 REs).

Optionally, the terminal device may also determine the first frequency domain resource only according to a specific RE on one RB or a default RE on one RB indicated by the second information. For example, the terminal device may determine the frequency domain resource consists of the specific RE or the default RE indicated by the second information on each RB within the entire RB range as the first frequency domain resource. In this case, it may also be considered that the first information indicates all RBs in the entire RB range.

Figure 8:
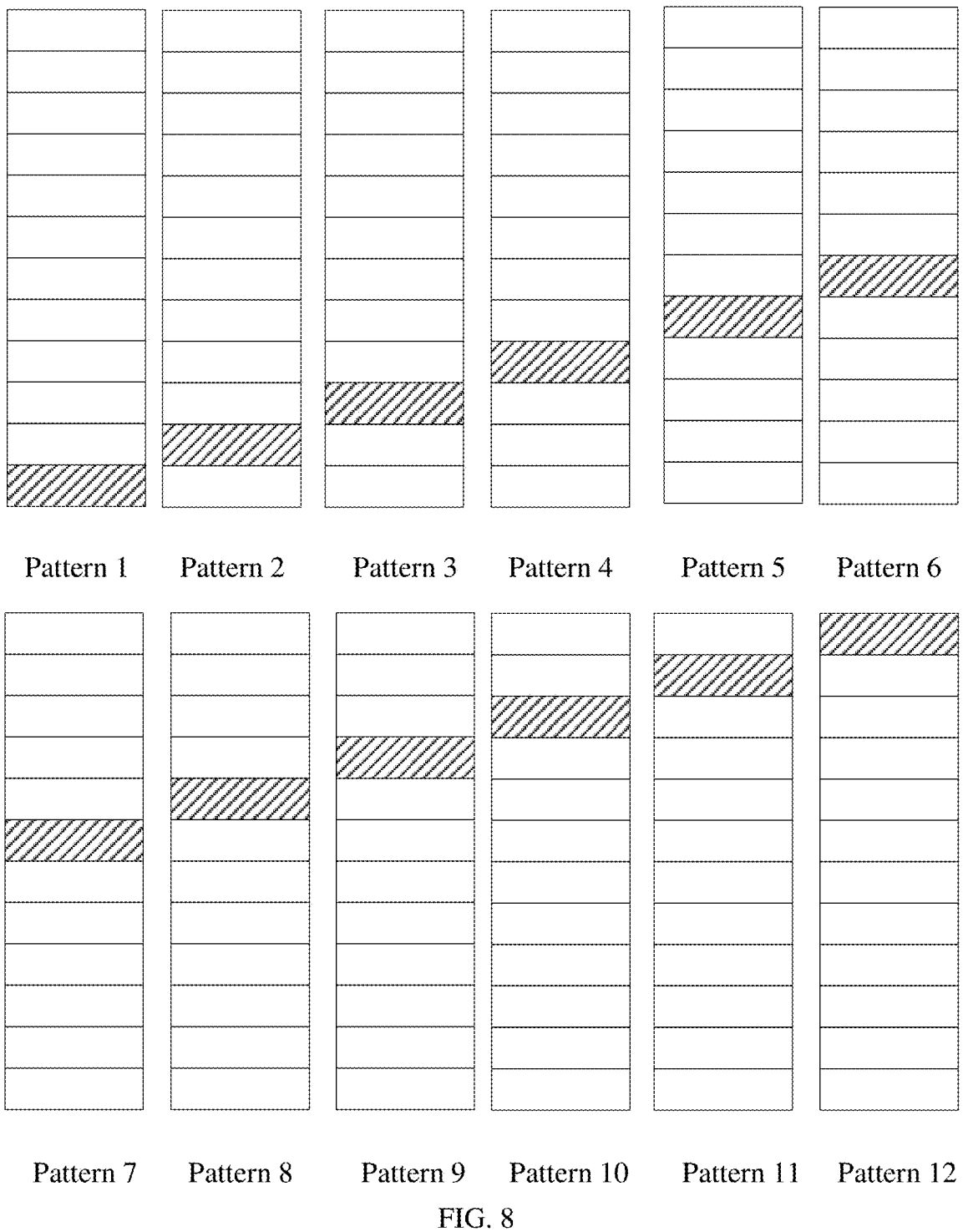
FIG. 8 is a schematic diagram of multiple patterns corresponding to a RB range in an embodiment of the present disclosure.

Optionally, the RE combination in the RB may also be represented by a pattern. One pattern is used for indicating at least one RE that may be used for measurement by the terminal device. For example, one RB corresponds to D patterns, and a combination of the D patterns may constitute one RB. The network device may configure the D patterns for the terminal device in advance, or the D patterns may also be agreed upon by the protocol. The network device may send the second information to the terminal device, and the second information may indicate at least one pattern, then the terminal device may determine the frequency domain resource consists of the at least one pattern indicated by the second information on each of the at least one RB within the RB range determined in any of the foregoing manners as the first frequency domain resource. For example, as shown in FIG. 8, one RB corresponds to 12 patterns, and a combination of the shaded part in each pattern may represent the entire RB. Among them, the first RE in pattern 1, the second RE in pattern 2, the third RE in pattern 3, the fourth RE in pattern 4, the fifth RE in pattern 5, the sixth RE in pattern 6, the seventh RE in the pattern 7, the eighth RE in the pattern 8, the ninth RE in the pattern 9, the tenth RE in the pattern 10, the eleventh RE in the pattern 11 and the twelfth RE in pattern 12 may be used for the interference measurement or the received energy measurement. If the first information indicates patterns 2, 4, and 6, the terminal device may determine the frequency domain resource consists of the second, fourth, and sixth REs on each RB in the at least one RB determined in the foregoing manner within the RE range as the first frequency domain resource. Similarly, the D patterns corresponding to one RB may also come from one or more pattern sets. For details, please refer to the B patterns corresponding to the RB range, which is not repeated here for brevity.

Figure 9:
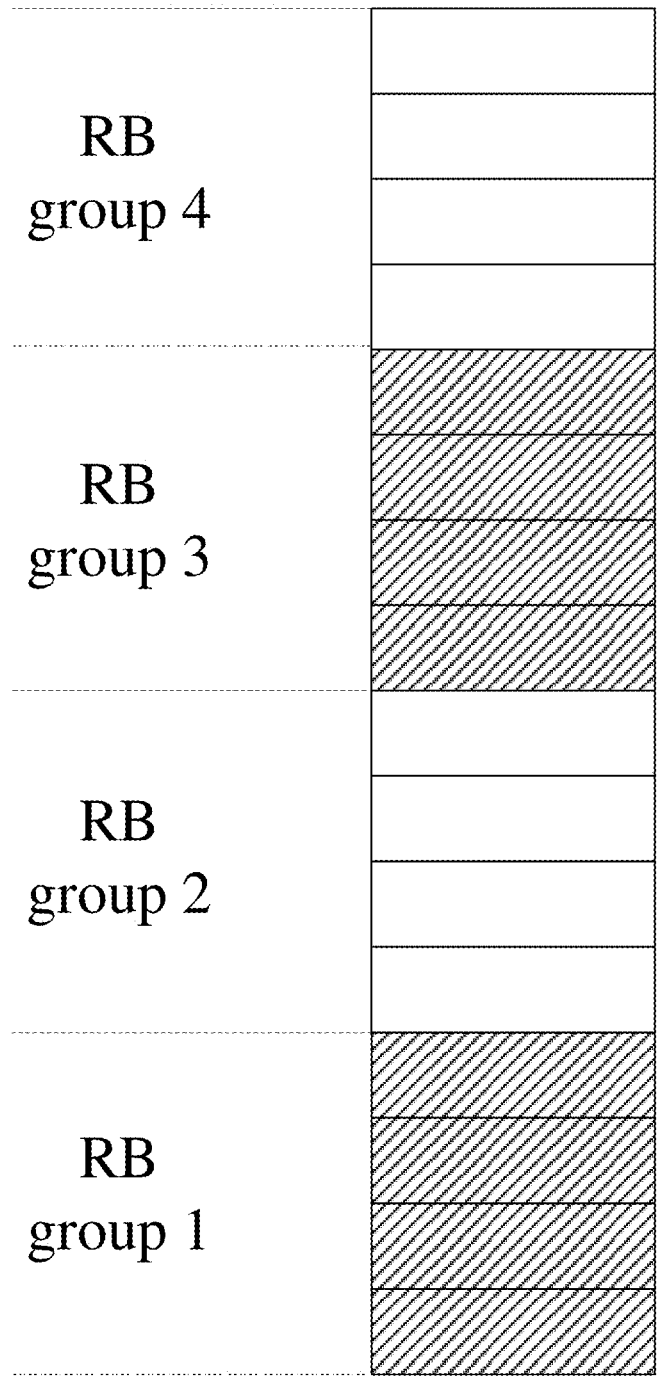
FIG. 9 is a schematic diagram of a RB grouping indicated by a bitmap in an embodiment of the present disclosure.

Optionally, the network device may indicate the foregoing various information through a bitmap. For example, the first information may include a first bitmap, and each bit in the first bitmap corresponds to one RB group. And a value of each bit in the first bitmap represents a state of one RB group. For example, if the value is 0, it means that the RB group is unavailable, and if the value is 1, it means that the RB group is available. FIG. 9 shows states of 4 RB groups corresponding to the values [1 0 1 0] in the first bitmap, and the first RB group and the third RB group may be used for the interference measurement or the received signal measurement.

Figure 10:
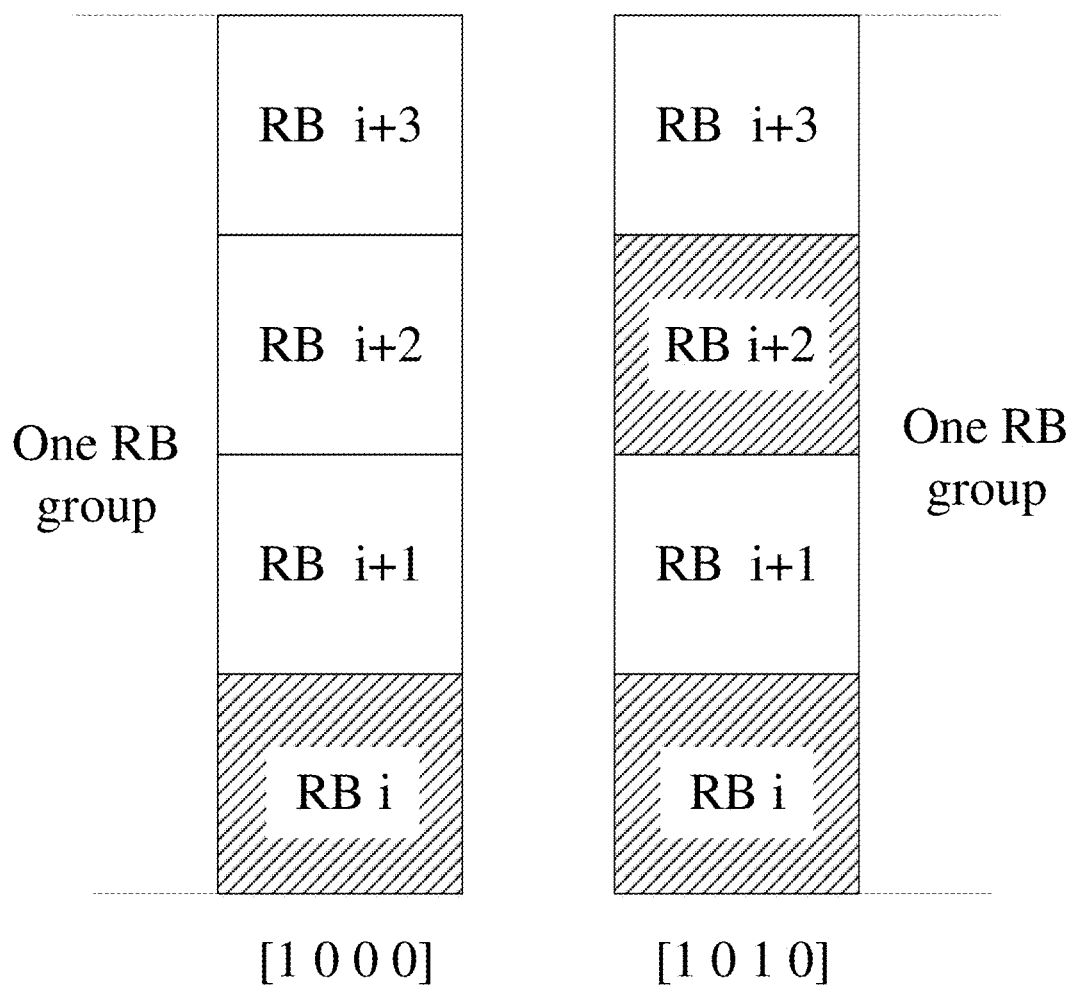
FIG. 10 is a schematic diagram of RBs in a RB grouping indicated by a bitmap in an embodiment of the present disclosure.

For another example, the first information may include a second bitmap, each bit in the second bitmap corresponds to one RB in one RB group, and a value of each bit in the second bitmap represents a state of one RB. For example, if the value is 0, it means that the RB is not available, and if the value is 1, it means that the RB is available. FIG. 10 shows states of the 4 RBs included in one RB group corresponding to the second bitmap with values [1 0 0 0] and [1 0 1 0], where [1 0 0 0] represents the first RB in one RB group is available, [1 0 1 0] indicates that the first and third RBs in one RB group are available.

Figure 11:
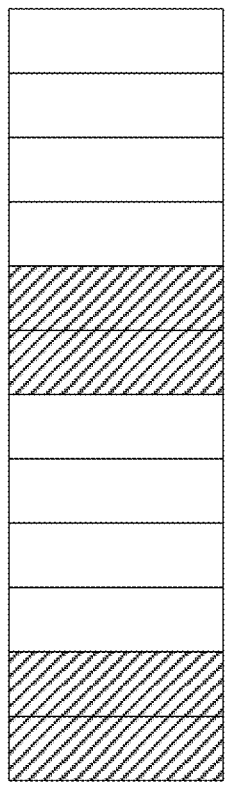
FIG. 11 is a schematic diagram of a frequency domain resource consists of at least one pattern in a RB range indicated by a bitmap in an embodiment of the present disclosure.
Figure 11:
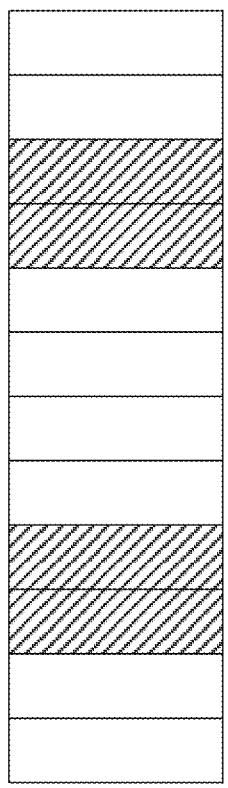
Figure 11:
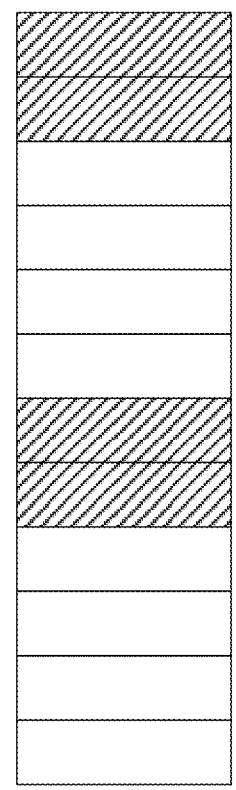
Figure 11:
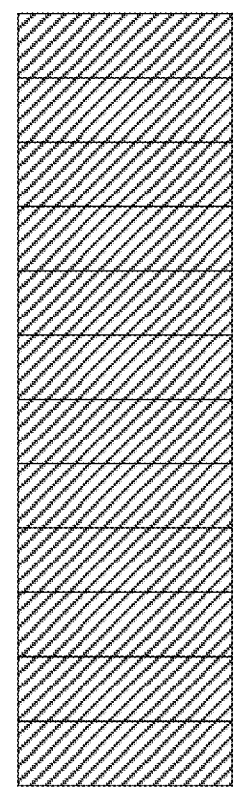

For another example, the first information may include a third bitmap, each bit in the third bitmap may correspond to one pattern, and a value of each bit in the third bitmap represents a state of one pattern. For example, if the value is 0, it means that the pattern is not available, and if the value is 1, it means that the pattern is available. FIG. 11 shows states of 3 patterns corresponding to the values [1 1 1] of the third bitmap, where the 3 patterns are all available, and the combined frequency domain resources may be the entire RB range.

Figure 12:
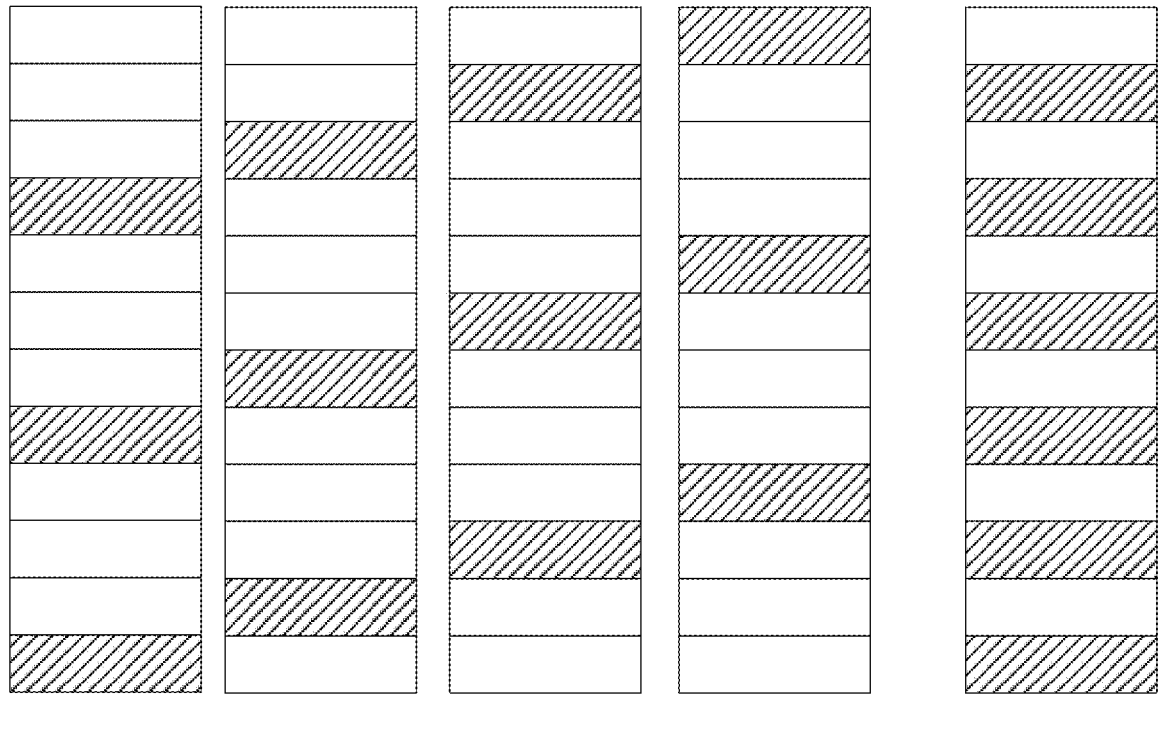
FIG. 12 is a schematic diagram of a frequency domain resource consists of at least one pattern in one RB indicated by a bitmap in an embodiment of the present disclosure.

For another example, the second information may include a fourth bitmap, each bit in the fourth bitmap may correspond to one pattern, and a value of each bit in the fourth bitmap represents a state of one pattern. For example, if the value is 0, it means that the pattern is not available, and if the value is 1, it means that the pattern is available. FIG. 12 shows states of 4 patterns corresponding to the values [1 0 1 0] of the fourth bitmap, and the combined frequency domain resources may include the $1^{st}$, $3^{rd}$, $5^{th}$, $7^{th}$, $9^{th}$ and $11^{th}$ REs.

Optionally, the network device may not use the bitmap to indicate the above information, and may also directly indicate the information. For example, as shown in FIG. 7, there are 7 patterns in total, and the network device may indicate one of them by 3 bits. The grouping is similar, and no too much description is given here.

Optionally, the network device may send third information to the terminal device, where the third information is used for indicating at least two of start RB information of the RB range, end RB information of the RB range, and information about the number of RBs included in the RB range. The terminal device may determine the RB range according to the third information. The start RB indicated by the third information may be included in the RB range or outside the RB range, and the end RB indicated by the third information may also be included in the RB range or outside the RB range.

Optionally, the network device may determine the range of the BWP as the RB range. In other words, the terminal device can determine the RB range according to the configuration of the BWP.

The above various information may be carried in various high layer or physical layer signaling such as a radio resource control (RRC), a MAC signaling or a downlink control information (DCI) signaling. The above-mentioned information may be sent separately or combined and sent together. For example, the first information may be sent together with the second information, the second information may be sent together with the third information, or the first information, the second information and the third information may be sent together.

Optionally, the terminal device may perform the interference measurement or the received energy measurement over the first frequency domain resource determined in the above manner to obtain a measurement value, for example, a RSSI value or a reference signal received power (RSRP) value etc. The terminal device may directly report the measurement value to the network device, or may report the value used for indicating the size of the measurement value to the network device, thereby reducing signaling overhead.

For example, the terminal device needs to determine the report value to be sent to the network device according to the RSSI value obtained by the measurement. It may be divided into multiple measurement intervals according to the size of the RSSI value, and each measurement interval corresponds to a report value. A mapping relationship between the multiple measurement intervals and the report values may be as shown in Table 3.

TABLE 3

Mapping relationship 1

| Report value | Result of measurement | Unit |
|---|---|---|
| Report value 0 | RSSI < −100 | dBm |
| Report value 1 | −100 ≤ RSSI < −99 | dBm |
| Report value 2 | −99 ≤ RSSI < −98 | dBm |
| ... | ... | ... |
| Report value 74 | −27 ≤ RSSI < −26 | dBm |
| Report value 75 | −26 ≤ RSSI < −25 | dBm |
| Report value 76 | −25 ≤ RSSI | dBm |

In Table 3, the measurement interval may be divided at equal intervals. Optionally, a measurement interval to which a minimum RSSI value belongs and a measurement interval to which a maximum RSSI value belongs may be excluded. The measurement interval may use 1 dBm as an interval to improve reporting accuracy, or use an interval greater than or equal to 2 dBm to reduce signaling overhead. For example, if the measured RSSI value is −99.5, the terminal device can report the report value 0 to the network device. For another example, if the measured RSSI value is −24, the terminal device can report the report value 76 to the network device. The interval of the measurement interval may be configured by the network device.

Optionally, a form of the report value may be agreed upon by the agreement, and an order of the report value in Table 3 may also vary. For example, RSSI<−100 and −25 RSSI can correspond to report value 0 and report value 1, or RSSI<100 and −25 RSSI can also correspond to report value 75 and report value 76, as long as one measurement interval corresponds to one report value.

Optionally, critical values of two adjacent measurement intervals in Table 3 may include any one of the two measurement intervals. For example, −27 RSSI<−26 and −26≤RSSI<−25 may be changed to −27≤RSSI≤−26 and −26<RSSI<−25.

Optionally, the upper boundary value −25 and the lower boundary value −100 in Table 3 may be adjusted, that is, may be increased or decreased, and two or one of the upper boundary value and the lower boundary value may be configured by the network device. The network device can flexibly determine the dynamic range according to the application scenario. For example, if the range in Table 3 is expanded, a larger range of measurement values may be reported, and if the range in Table 3 is reduced, the transmission resources required for reporting may be saved.

Optionally, the multiple measurement intervals may also be divided by at least one threshold. For example, the network device may configure one or more thresholds, or one or more thresholds may be agreed upon by the protocol, and the RSSI value is divided into multiple intervals according to the one or more thresholds. Table 4 shows another mapping relationship of multiple measurement intervals and multiple report values, where thre, thre+x, thre+2x, and thre+3x may be considered as thresholds. Thre may also be considered as a threshold value, and x may be an interval agreed upon by the protocol or configured by the network device.

TABLE 4

Mapping relationship 2

| Report value | Result of measurement | Unit |
|---|---|---|
| Report value 0 | thre ≤ RSSI < thre + x | dBm |
| Report value 1 | thre + x ≤ RSSI < thre + 2x | dBm |
| Report value 2 | thre + 2x ≤ RSSI < thre + 3x | dBm |
| ... | ... | ... |
| Report value n | −25 ≤ RSSI | dBm |

Specifically, when there is only one threshold value, the RSSI value may be divided into two measurement intervals, one is a measurement interval greater than or equal to the threshold value, the other is a measurement interval less than the threshold value. The measurement interval greater than or equal to the threshold value corresponds to one report value, and the measurement interval less than the threshold value corresponds to another report value. Or, only when the measured value is greater than the threshold value, it is reported to the network device, for example, the corresponding report value is reported. This may reduce the overhead of reporting resources.

The terminal device may also take a threshold value thre as a starting value, and determine the mapping relationship according to the interval x agreed by the protocol or configured by the network device, as shown in Table 4. The other boundary value may be assumed to be −25, or it may be thre+N*x, and N may also be a positive integer agreed by the protocol or configured by the network device.

Optionally, an order of report values in Table 4 may also vary. Critical values of two adjacent measurement intervals in Table 4 may also include any one of the two measurement intervals.

Optionally, the terminal device may send the foregoing determined report value to the network device through the RRC signaling, the MAC control element (CE) signaling, or the physical uplink control channel (PUCCH).

After receiving the report value of the terminal device, the network device may the uplink and downlink transmission mode according to a size of the measured value indicated by the report value. For example, if the RSSI value reported by the UE is large, the network device may perform scheduling or configuration, to avoid interference caused by other devices to the UE; if the RSSI value reported by the UE is small, the network device may schedule the resource corresponding to the UE without affecting the performance of the UE.

Figure 13:
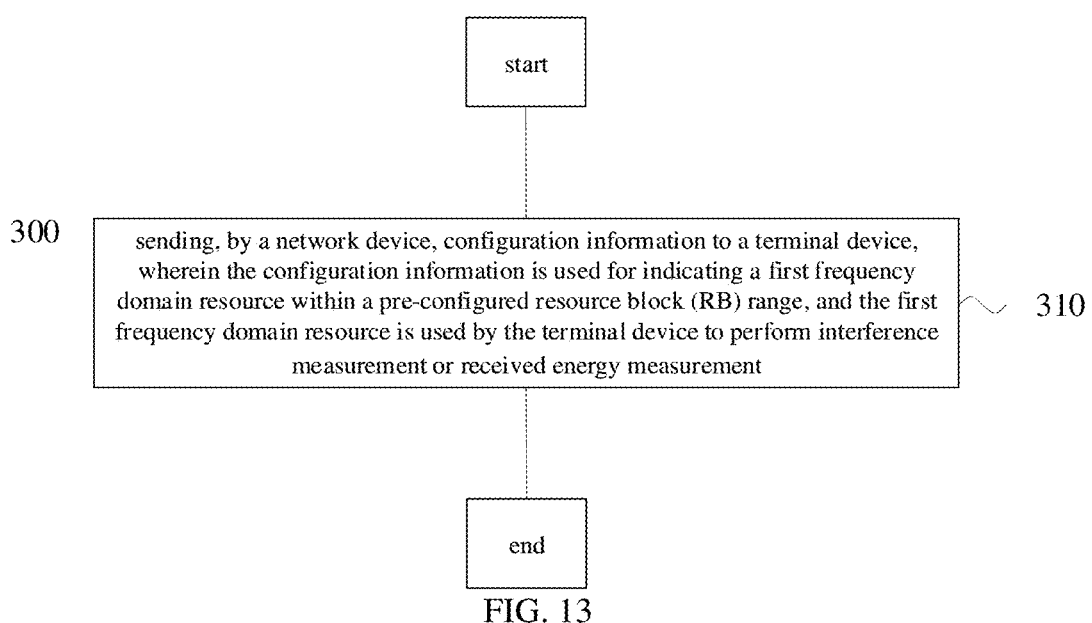
FIG. 13 is another schematic diagram of a wireless communication method provided by an embodiment of the present disclosure.

FIG. 13 is a schematic block diagram of a wireless communication method 300 according to an embodiment of the present disclosure. As shown in FIG. 13, the method 300 includes some or all of the following content.

In S310, the network device sends configuration information to a terminal device, wherein the configuration information is used for indicating a first frequency domain resource within a pre-configured resource block (RB) range, and the first frequency domain resource is used by the terminal device to perform interference measurement or received energy measurement.

Optionally, in the embodiments of the present disclosure, the configuration information includes first information, and the first information is used for indicating at least one RB within the RB range.

Optionally, in the embodiments of the present disclosure, the first information is used for indicating at least one RB in a RB group, the RB group includes A RBs, and A is a positive integer.

Optionally, in the embodiments of the present disclosure, the first information is used for indicating at least one RB in a RB group, the RB group includes A RBs, and A is a positive integer.

Optionally, in the embodiments of the present disclosure, A is determined based on at least one of the following information: protocol agreement information, network configuration information, and the RB range.

Optionally, in the embodiments of the present disclosure, the RB range corresponds to B patterns, and the first information is used for indicating at least one pattern among the B patterns, and one pattern is used for indicating at least one RB used for measurement, and B is a positive integer.

Optionally, in the embodiments of the present disclosure, the B patterns are composed of C pattern sets, and the at least one pattern includes a pattern in one pattern set or a plurality of pattern sets in the C pattern sets, and C is a positive integer.

Optionally, in the embodiments of the present disclosure, the first information includes a first bitmap, and the at least one RB group is represented by a value of each bit in the first bitmap.

Optionally, in the embodiments of the present disclosure, the first information includes a second bitmap, and the at least one RB in the RB group is represented by a value of each bit in the second bitmap.

Optionally, in the embodiments of the present disclosure, the first information includes a third bitmap, and the at least one pattern is represented by a value of each bit in the third bitmap.

Optionally, in the embodiments of the present disclosure, the configuration information includes second information, and the second information is used for indicating at least one resource element (RE) in a RB.

Optionally, in the embodiments of the present disclosure, one RB corresponds to D patterns, and the second information is used for indicating at least one pattern among the D patterns, and one pattern is used for indicating at least one RE used for measurement, and D is a positive integer.

Optionally, in the embodiments of the present disclosure, the second information includes a fourth bitmap, and the at least one pattern is represented by a value of each bit in the fourth bitmap.

Optionally, in the embodiments of the present disclosure, the configuration information includes third information, and the third information is used for indicating at least two of start RB information of the RB range, end RB information of the RB range, and information about the number of RBs included in the RB range.

Optionally, in the embodiments of the present disclosure, the configuration information is carried in a radio resource control (RRC) signaling.

Optionally, in the embodiments of the present disclosure, the RB range is a range of a bandwidth part (BWP).

Optionally, in the embodiments of the present disclosure, the method further includes t receiving, by the network device, a report value sent by the terminal device, and the report value is used for indicating a received signal strength indicator (RSSI) value obtained by the terminal device to perform the interference measurement or the received energy measurement over the first frequency domain resource.

Optionally, in the embodiments of the present disclosure, the method further includes sending, by the network device, a mapping relationship between multiple measurement intervals and multiple report values to the terminal device, and the RSSI value belongs to any measurement interval of the multiple measurement intervals.

Optionally, in the embodiments of the present disclosure, an interval of each measurement interval in the multiple measurement intervals except a measurement interval to which a minimum RSSI value belongs and a measurement interval to which a maximum RSSI value belongs are equal.

Optionally, in the embodiments of the present disclosure, the receiving, by the network device, the report value sent by the terminal device includes receiving, by the network device, the report value sent by the terminal device through the radio resource control (RRC) signaling.

Optionally, in the embodiments of the present disclosure, the receiving, by the network device, the report value sent by the terminal device includes receiving, by the network device, the report value sent by the terminal device through a media access control (MAC) control element (CE) signaling.

Optionally, in the embodiments of the present disclosure, the receiving, by the network device, the report value sent by the terminal device includes receiving, by the network device, the report value sent by the terminal device through a physical uplink control channel (PUCCH).

Optionally, in the embodiments of the present disclosure, the multiple measurement intervals are divided by at least one threshold.

It should be understood that the interaction between the network device and the terminal device described by the network device and related characteristics and functions correspond to the related characteristics and functions of the terminal device. That is to say, what message the network device sends to the terminal device, and the terminal device receives the corresponding message from the network device.

It should also be understood that, in the various embodiments of the present disclosure, a size of the sequence number of the foregoing processes does not mean the order of execution. The execution order of each process should be determined by its function and internal logic, and should not constitute any limitation for the implementation process of the embodiments of the present disclosure.

The wireless communication method according to the embodiments of the present disclosure is described in detail above. The wireless communication device according to the embodiments of the present disclosure will be described below in conjunction with FIG. 14 to FIG. 17. The technical features described in the method embodiments are applicable to the following device embodiments.

Figure 14:
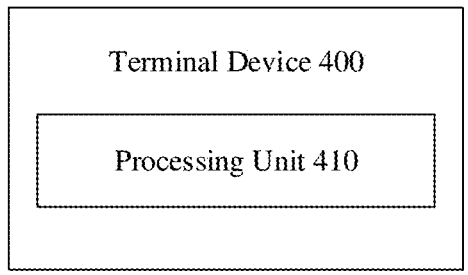
FIG. 14 is a schematic block diagram of a terminal device provided by an embodiment of the present disclosure.

FIG. 14 shows a schematic block diagram of a terminal device 400 according to an embodiment of the present disclosure. As shown in FIG. 14, the terminal device 400 includes a processing unit 410, configured to determine a first frequency domain resource within a pre-configured resource block (RB) range; and perform interference measurement or received energy measurement over the first frequency domain resource.

Optionally, in the embodiments of the present disclosure, the terminal device further includes a transceiver unit, configured to receive first information, and the first information is used for indicating at least one RB within the RB range; and the processing unit is specifically configured to determine the first frequency domain resource according to the first information.

Optionally, in the embodiments of the present disclosure, the processing unit is specifically configured to determine the first frequency domain resource according to at least one default RB within the RB range.

Optionally, in the embodiments of the present disclosure, the first information is used for indicating at least one RB group, the RB group includes A RBs, and the processing unit is specifically configured to determine the first frequency domain resource according to a RB group indicated by the first information within the RB range, and A is a positive integer.

Optionally, in the embodiments of the present disclosure, the first information is used for indicating at least one RB in a RB group, the RB group includes A RBs, and the processing unit is specifically configured to determine the first frequency domain resource according to the at least one RB indicated by the first information in each RB group within the RB range, and A is a positive integer.

Optionally, in the embodiments of the present disclosure, the processing unit is specifically configured to determine the first frequency domain resource according to the at least one default RB in each RB group within the RB range, and the RB group includes A RBs, and A is a positive integer.

Optionally, in the embodiments of the present disclosure, the at least one default RB in the RB group includes a first RB in the RB group.

Optionally, in the embodiments of the present disclosure, A is determined based on at least one of the following information: protocol agreement information, network configuration information, and the RB range.

Optionally, in the embodiments of the present disclosure, the RB range corresponds to B patterns, and the first information is used for indicating at least one pattern among the B patterns, and one pattern is used for indicating at least one RB used for measurement, and the processing unit is specifically configured to determine the first frequency domain resource according to the at least one pattern indicated by the first information within the RB range, and B is a positive integer.

Optionally, in the embodiments of the present disclosure, the B patterns are composed of C pattern sets, and the at least one pattern includes a pattern in one pattern set or a plurality of pattern sets in the C pattern sets, and C is a positive integer.

Optionally, in the embodiments of the present disclosure, the first information includes a first bitmap, and the at least one RB group is represented by a value of each bit in the first bitmap.

Optionally, in the embodiments of the present disclosure, the first information includes a second bitmap, and the at least one RB in the RB group is represented by a value of each bit in the second bitmap.

Optionally, in the embodiments of the present disclosure, the first information includes a third bitmap, and the at least one pattern is represented by a value of each bit in the third bitmap.

Optionally, in the embodiments of the present disclosure, the first information is carried in a radio resource control (RRC) signaling.

Optionally, in the embodiments of the present disclosure, the terminal device further includes a transceiver unit, configured to receive second information, and the second information is used for indicating at least one resource element (RE) in a RB; the processing unit is specifically configured to determine the first frequency domain resource according to the second information.

Optionally, in the embodiments of the present disclosure, the transceiver unit is further configured to receive second information, and the second information is used for indicating at least one resource element (RE) in a RB; the processing unit is specifically configured to determine the first frequency domain resource according to the first information and the second information.

Optionally, in the embodiments of the present disclosure, the processing unit is specifically configured to determine a frequency domain resource consists of the at least one RE indicated by the second information in each of the at least one RB within the RB range as the first frequency domain resource.

Optionally, in the embodiments of the present disclosure, the processing unit is specifically configured to determine the first frequency domain resource according to at least one default resource element (RE) in the at least one RB within the RB range.

Optionally, in the embodiments of the present disclosure, one RB corresponds to D patterns, and the second information is used for indicating at least one pattern among the D patterns, and one pattern is used for indicating at least one RE used for measurement. The processing unit is specifically configured to determine a frequency domain resource consists of at least one pattern indicated by the second information in each of the at least one RB within the RB range as the first frequency domain resource, and D is a positive integer.

Optionally, in the embodiments of the present disclosure, the second information includes a fourth bitmap, and the at least one pattern is represented by a value of each bit in the fourth bitmap.

Optionally, in the embodiments of the present disclosure, the second information is carried in the radio resource control (RRC) signaling.

Optionally, in the embodiments of the present disclosure, the transceiver unit is further configured to receive third information, and the third information is used for indicating at least two of start RB information of the RB range, end RB information of the RB range, and information about the number of RBs included in the RB range; and determine the RB range according to the third information.

Optionally, in the embodiments of the present disclosure, the second information and the third information are carried in a same radio resource control (RRC) signaling.

Optionally, in the embodiments of the present disclosure, the RB range is a range of a bandwidth part (BWP).

Optionally, in the embodiments of the present disclosure, the processing unit is further configured to determine a report value to be sent to a network device according to a received signal strength indicator (RSSI) value obtained by measurement.

Optionally, in the embodiments of the present disclosure, the processing unit is specifically configured to determine the report value according to a measurement interval to which the RSSI value belongs and a mapping relationship between multiple measurement intervals and multiple report values.

Optionally, in the embodiments of the present disclosure, an interval of each measurement interval in the multiple measurement intervals except a measurement interval to which a minimum RSSI value belongs and a measurement interval to which a maximum RSSI value belongs are equal.

Optionally, in the embodiments of the present disclosure, the multiple measurement intervals are divided by at least one threshold.

Optionally, in the embodiments of the present disclosure, the terminal device further includes a transceiver unit, configured to send the report value to the network device.

Optionally, in the embodiments of the present disclosure, the transceiver unit is specifically configured to send the report value to the network device through the radio resource control (RRC) signaling.

Optionally, in the embodiments of the present disclosure, the transceiver unit is specifically configured to send the report value to the network device through a media access control (MAC) control element (CE) signaling.

Optionally, in the embodiments of the present disclosure, the transceiver unit is specifically configured to send the report value to the network device through a physical uplink control channel (PUCCH).

Optionally, in the embodiments of the present disclosure, the interference measurement or the received energy measurement includes a cross-link interference (CLI) measurement.

Optionally, in the embodiments of the present disclosure, the RB is a physical resource block (PRB).

It should be understood that the terminal device 400 according to the embodiments of the present disclosure may correspond to the terminal device in the method embodiments of the present disclosure, and the foregoing and other operations and/or functions of individual units in the terminal device 400 are respectively for implementing the corresponding processes of the terminal device in the method of FIG. 3. For the sake of brevity, details are not described herein again.

Figure 15:
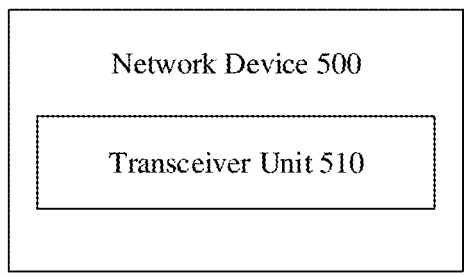
FIG. 15 is a schematic block diagram of a network device provided by an embodiment of the present disclosure.

FIG. 15 shows a schematic block diagram of a network device 500 according to an embodiment of the present disclosure. As shown in FIG. 15, the network device 500 includes a transceiver unit 510, configured to send configuration information to a terminal device, and the configuration information is used for indicating a first frequency domain resource within a pre-configured resource block (RB) range, and the first frequency domain resource is used by the terminal device to perform interference measurement or received energy measurement.

Optionally, in the embodiments of the present disclosure, the configuration information includes first information, and the first information is used for indicating at least one RB within the RB range.

Optionally, in the embodiments of the present disclosure, the first information is used for indicating at least one RB group, the RB group includes A RBs, and A is a positive integer.

Optionally, in the embodiments of the present disclosure, the first information is used for indicating at least one RB in a RB group, the RB group includes A RBs, and A is a positive integer.

Optionally, in the embodiments of the present disclosure, A is determined based on at least one of the following information: protocol agreement information, network configuration information, and the RB range.

Optionally, in the embodiments of the present disclosure, the RB range corresponds to B patterns, and the first information is used for indicating at least one pattern among the B patterns, and one pattern is used for indicating at least one RB used for measurement, and B is a positive integer.

Optionally, in the embodiments of the present disclosure, the B patterns are composed of C pattern sets, and the at least one pattern includes a pattern in one pattern set or a plurality of pattern sets in the C pattern sets, and C is a positive integer.

Optionally, in the embodiments of the present disclosure, the first information includes a first bitmap, and the at least one RB group is represented by a value of each bit in the first bitmap.

Optionally, in the embodiments of the present disclosure, the first information includes a second bitmap, and at least one RB in the RB group is represented by the value of each bit in the second bitmap.

Optionally, in the embodiments of the present disclosure, the first information includes a third bitmap, and the at least one pattern is represented by a value of each bit in the third bitmap.

Optionally, in the embodiments of the present disclosure, the configuration information includes second information, and the second information is used for indicating at least one resource element (RE) in a RB.

Optionally, in the embodiments of the present disclosure, one RB corresponds to D patterns, and the second information is used for indicating at least one pattern among the D patterns, and one pattern is used for indicating at least one RE used for measurement, and D is a positive integer.

Optionally, in the embodiments of the present disclosure, the second information includes a fourth bitmap, and the at least one pattern is represented by a value of each bit in the fourth bitmap.

Optionally, in the embodiments of the present disclosure, the configuration information includes third information, and the third information is used for indicating at least two of start RB information of the RB range, end RB information of the RB range, and information about the number of RBs included in the RB range.

Optionally, in the embodiments of the present disclosure, the configuration information is carried in a radio resource control (RRC) signaling.

Optionally, in the embodiments of the present disclosure, the RB range is a range of a bandwidth part (BWP).

Optionally, in the embodiments of the present disclosure, the transceiver unit is further configured to receive a report value sent by the terminal device, and the report value is used for indicating a received signal strength indicator (RSSI) value obtained by the terminal device to perform the interference measurement or the received energy measurement over the first frequency domain resource.

Optionally, in the embodiments of the present disclosure, the transceiver unit is further configured to send a mapping relationship between multiple measurement intervals and multiple report values to the terminal device, and the RSSI value belongs to any measurement interval of the multiple measurement intervals.

Optionally, in the embodiments of the present disclosure, an interval of each measurement interval in the multiple measurement intervals except a measurement interval to which a minimum RSSI value belongs and a measurement interval to which a maximum RSSI value belongs are equal.

Optionally, in the embodiments of the present disclosure, the multiple measurement intervals are divided by at least one threshold.

Optionally, in the embodiments of the present disclosure, the transceiver unit is specifically configured to receive the report value sent by the terminal device through the radio resource control (RRC) signaling.

Optionally, in the embodiments of the present disclosure, the transceiver unit is specifically configured to receive the report value sent by the terminal device through a media access control (MAC) control element (CE) signaling.

Optionally, in the embodiments of the present disclosure, the transceiver unit is specifically configured to receive the report value sent by the terminal device through a physical uplink control channel (PUCCH).

It should be understood that the network device 500 according to the embodiments of the present disclosure may correspond to the network device in the method embodiments of the present disclosure, and the foregoing and other operations and/or functions of individual units in the network device 500 are respectively for implementing the corresponding processes of the network device in the method of FIG. 13. For the sake of brevity, details are not described herein again.

Figure 16:
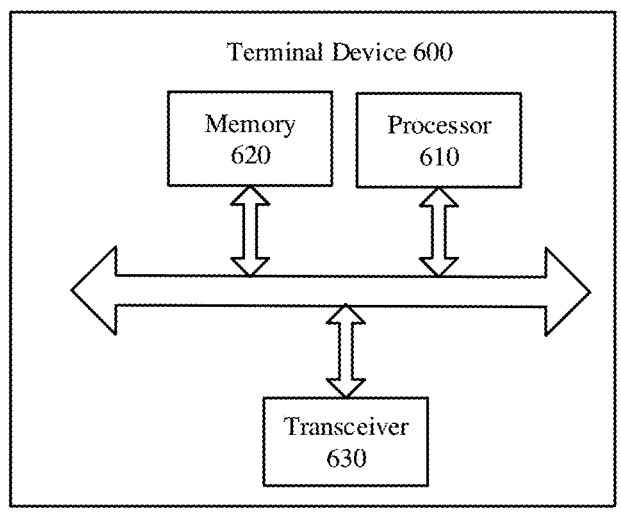
FIG. 16 is another schematic block diagram of a terminal device provided by an embodiment of the present disclosure.

As shown in FIG. 16, the embodiments of the present disclosure also provide a terminal device 600. The terminal device 600 may be the terminal device 400 in FIG. 14, which may be configured to execute the content of the terminal device corresponding to the method 200 in FIG. 3. The terminal device 600 shown in FIG. 16 includes a processor 610. The processor 610 may invoke a computer program from a memory and run the computer program, to implement the method in the embodiments of the present disclosure.

Optionally, as shown in FIG. 16, the terminal device 600 may further include a memory 620. The processor 610 may invoke the computer program from the memory 620 and run the computer program, to implement the method in the embodiments of the present disclosure.

The memory 620 may be a component independent of the processor 610, or may be integrated into the processor 610.

Optionally, as shown in FIG. 16, the terminal device 600 may further include a transceiver 630. The processor 610 may control the transceiver 630 to communicate with another device, and specifically, the transceiver 630 may transmit information or data to another device, or receive information or data transmitted by another device.

The transceiver 630 may include a transmitter and a receiver. The transceiver 630 may further include an antenna. There may be one or more antennas.

Optionally, the terminal device 600 may be the terminal device in the embodiments of the present disclosure, and the terminal device 600 can implement corresponding procedures implemented by the terminal device in various methods in the embodiments of the present disclosure. For brevity, details are not described herein again.

In a specific implementation, a transceiver unit in the terminal device 400 may be implemented by the transceiver 630 in FIG. 16. A processing unit in the terminal device 400 may be implemented by the processor 610 in FIG. 16.

Figure 17:
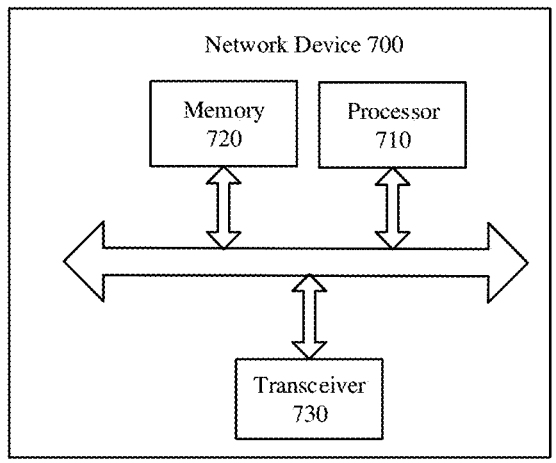
FIG. 17 is another schematic block diagram of a network device provided by an embodiment of the present disclosure.

As shown in FIG. 17, the embodiments of the present disclosure also provide a network device 700. The network device 700 may be the network device 500 in FIG. 15, which may be configured to execute the content of the network device corresponding to the method 300 in FIG. 13. The network device 700 shown in FIG. 17 includes a processor 710. The processor 710 may invoke a computer program from a memory and run the computer program, to implement the method in the embodiments of the present disclosure.

Optionally, as shown in FIG. 17, the network device 700 may further include a memory 720. The processor 710 may invoke the computer program from the memory 720 and run the computer program, to implement the method in the embodiments of the present disclosure.

The memory 720 may be a component independent of the processor 710, or may be integrated into the processor 710.

Optionally, as shown in FIG. 17, the network device 700 may further include a transceiver 730. The processor 710 may control the transceiver 730 to communicate with another device, and specifically, the transceiver 730 may transmit information or data to another device, or receive information or data transmitted by another device.

The transceiver 730 may include a transmitter and a receiver. The transceiver 730 may further include an antenna. There may be one or more antennas.

Optionally, the network device 700 may be the network device in the embodiments of the present disclosure, and the network device 700 can implement corresponding procedures implemented by the network device in various methods in the embodiments of the present disclosure. For brevity, details are not described herein again.

In a specific implementation, a transceiver unit in the network device 500 may be implemented by the transceiver 730 in FIG. 17. A processing unit in the network device 500 may be implemented by the processor 710 in FIG. 17.

Figure 18:
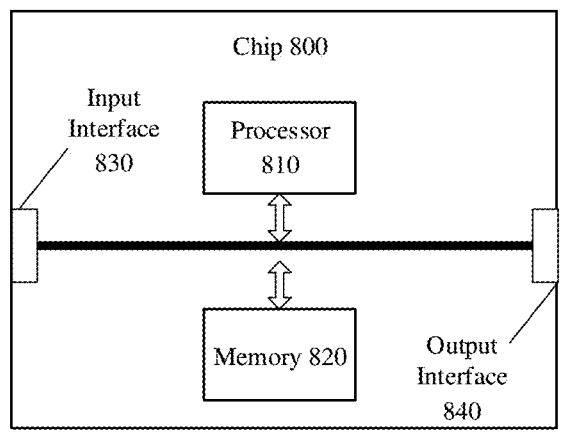
FIG. 18 is a schematic block diagram of a chip provided by an embodiment of the present disclosure.

FIG. 18 is a schematic structural diagram of a chip according to an embodiment of the present disclosure. The chip 800 shown in FIG. 18 includes a processor 810. The processor 810 may invoke a computer program from a memory and run the computer program, to implement the method in the embodiments of the present disclosure.

Optionally, as shown in FIG. 18, the chip 800 may further include a memory 820. The processor 810 may invoke the computer program from the memory 820 and run the computer program, to implement the method in the embodiments of the present disclosure.

The memory 820 may be a component independent of the processor 810, or may be integrated into the processor 810.

Optionally, the chip 800 may further include an input interface 830. The processor 810 may control the input interface 830 to communicate with another device or chip, and specifically, the input interface 830 may obtain information or data transmitted by another device or chip.

Optionally, the chip 800 may further include an output interface 840. The processor 810 may control the output interface 840 to communicate with another device or chip, and specifically, the output interface 840 may output information or data to another device or chip.

Optionally, the chip may be applied in the network device according to embodiments of the present disclosure, and the chip can implement corresponding procedures implemented by the network device in various methods in the embodiments of the present disclosure. For brevity, details are not described herein again.

Optionally, the chip may be applied to the terminal device in the embodiments of the present disclosure, and the chip can implement corresponding procedures implemented by the terminal device in various methods in the embodiments of the present disclosure. For brevity, details are not described herein again.

It should be noted that, the chip mentioned in the embodiments of the present disclosure may also be referred to as a system-level chip, a system chip, a chip system, a system on chip, or the like.

Figure 19:
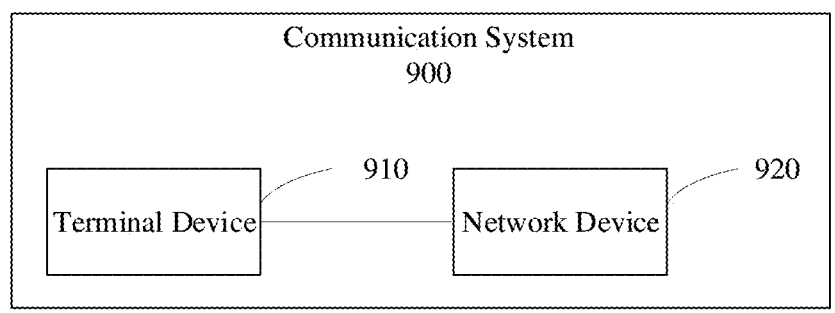
FIG. 19 is a schematic block diagram of a communication system provided by an embodiment of the present disclosure.

FIG. 19 is a schematic structural diagram of a communication system 900 according to an embodiment of the present disclosure. The communication system 900 shown in FIG. 19 includes a terminal device 910 and a network device 920.

The terminal device 910 can implement corresponding functions implemented by the terminal device in the foregoing method and the network device 920 can implement corresponding functions implemented by the network device in the foregoing method. For brevity, details are not described herein again.

It should be understood that, the processor of the embodiments of the present disclosure may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). It should be noted that, the memory of the system and the method described in the embodiments of the present disclosure is intended to include but is not limited to these memories and any other suitable type of memory.

It should be understood that, the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in the embodiments of the present disclosure is intended to include but is not limited to these memories and any other suitable type of memory.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer readable storage medium may be applied to the mobile terminal/terminal device in the embodiments of the present disclosure, and the computer program enables the computer to execute a corresponding procedure implemented by the mobile terminal/terminal device in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details are not described herein again.

Optionally, the computer program product may be applied to the terminal device in the embodiments of the present disclosure, and the computer program instruction enables the computer to execute a corresponding procedure implemented by the terminal device in the methods of the embodiments of the present disclosure. For brevity, details are not described herein again.

The present disclosure further provides a computer program.

Optionally, the computer program may be applied to the network device in the embodiments of the present disclosure, and when run on a computer, the computer program instruction enables the computer to execute a corresponding procedure implemented by the network device in the methods of the embodiments of the present disclosure. For brevity, details are not described herein again.

Optionally, the computer program may be applied to the terminal device in the embodiments of the present disclosure, and when run on a computer, the computer program instruction enables the computer to execute a corresponding procedure implemented by the terminal device in the methods of the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for wireless communication, comprising:
   determining, by a terminal device, a first frequency domain resource within a pre-configured physical resource block (PRB) range; and
   performing, by the terminal device, cross-link interference (CLI) measurement over the first frequency domain resource,
   wherein the method further comprises:
   determining, by the terminal device, a report value to be sent to a network device according to a received signal strength indicator (RSSI) value obtained by measurement,
   wherein the determining, by the terminal device, the report value to be sent to the network device according to the received signal strength indicator (RSSI) value obtained by measurement comprises:
   determining, by the terminal device, the report value according to a measurement interval to which the RSSI value belongs and a mapping relationship between multiple measurement intervals and multiple report values, and
   wherein an interval of each measurement interval in the multiple measurement intervals except a measurement interval to which a minimum RSSI value belongs equals to a measurement interval to which a maximum RSSI value belongs.

2. The method according to claim 1, further comprising:
   receiving, by the terminal device, first information, wherein the first information is used for indicating at least one PRB,
   wherein the determining, by the terminal device, the first frequency domain resource within the pre-configured PRB range comprises:
   determining, by the terminal device, the first frequency domain resource within the PRB range according to the first information and the PRG range,
   wherein the PRB range is agreed by a protocol.

3. The method according to claim 2, wherein the first information is used for indicating at least one PRB group, an PRB group comprises A PRBs, and the determining, by the terminal device, the first frequency domain resource within the PRB range according to the first information comprises:
   determining, by the terminal device, the first frequency domain resource according to a PRB group indicated by the first information within the PRB range, wherein A is a positive integer.

4. The method according to claim 2, wherein the first information is carried in a radio resource control (RRC) signaling.

5. The method according to claim 1, wherein the PRB range is a range of a bandwidth part (BWP).

6. The method according to claim 1, wherein the multiple measurement intervals are divided by at least one threshold value of the measurement.

7. The method according to claim 1 wherein the method further comprises: sending, by the terminal device, the report value to the network device through a radio resource control (RRC) signaling.

8. The method according to claim 2, wherein the PRB range agreed by the protocol comprises start PRB information of the PRB range and information about a number of PRB s comprised in the PRB range.

9. A terminal device, comprising a processor and a memory, wherein the memory is configured to store a computer program, and the processor is configured to call and run the computer program stored in the memory to cause the terminal device to perform a wireless communication method, comprising:
   determining a first frequency domain resource within a pre-configured physical resource block (PRB) range; and
   performing cross-link interference (CLI) measurement over the first frequency domain resource,
   wherein the terminal device is further caused to:
   determine a report value to be sent to a network device according to a received signal strength indicator (RSSI) value obtained by measurement,
   determine the report value according to a measurement interval to which the RSSI value belongs and a mapping relationship between multiple measurement intervals and multiple report values, and
   wherein an interval of each measurement interval in the multiple measurement intervals except a measurement interval to which a minimum RSSI value belongs equals to a measurement interval to which a maximum RSSI value belongs.

10. The terminal device according to claim 9, wherein the terminal device is further caused to:
    receive first information, wherein the first information is used for indicating at least one PRB; and
    determine the first frequency domain resource according to the first information and the PRG range,
    wherein the PRB range is agreed by a protocol.

11. The terminal device according to claim 10, wherein the first information is used for indicating at least one PRB group and an PRB group comprises A PRBs, and the terminal device is further caused to:
  determine the first frequency domain resource according to an PRB group indicated by the first information within the PRB range, wherein A is a positive integer.

12. The terminal device according to claim 10, wherein the first information is carried in a radio resource control (RRC) signaling.

13. The terminal device according to claim 9, wherein the PRB range is a range of a bandwidth part (BWP).

14. The terminal device according to claim 9, wherein the multiple measurement intervals are divided by at least one threshold value of the measurement.

15. The terminal device according to claim 9, wherein the terminal device further comprises: a transceiver unit, configured to send the report value to the network device through a radio resource control (RRC) signaling.

16. The terminal device according to claim 10, wherein the PRB range agreed by the protocol comprises start PRB information of the PRB range and information about a number of PRBs comprised in the PRB range.

17. A network device, comprising a processor and a memory, wherein the memory is configured to store a computer program, and the processor is configured to call and run the computer program stored in the memory to cause the network device to perform a wireless communication method, comprising:
  sending configuration information to a terminal device, and the configuration information is used for indicating a first frequency domain resource within a pre-configured physical resource block (PRB) range which is capable of being used for cross-link interference (CLI) measurement,
  receiving a report value determined by the terminal device according to a received signal strength indicator (RSSI) value obtained by measurement, and
  sending a mapping relationship between multiple measurement intervals and multiple report values to the terminal device, wherein the RSSI value belongs to any measurement interval of the multiple measurement intervals,
  wherein an interval of each measurement interval in the multiple measurement intervals except a measurement interval to which a minimum RSSI value belongs equals to a measurement interval to which a maximum RSSI value belongs.

18. The network device according to claim 17, wherein the configuration information comprises first information, and the first information is used for indicating at least one PRB.

19. The network device according to claim 18, wherein the first information is used for indicating at least one PRB group, a PRB group comprises A PRBs, and A is a positive integer.

20. The network device according to claim 17, wherein the configuration information is carried in a radio resource control (RRC) signaling.

* * * * *